H. HANSTEIN.
EDUCATIONAL APPLIANCE.
APPLICATION FILED DEC. 22, 1908.
951,606.
Patented Mar. 8, 1910.
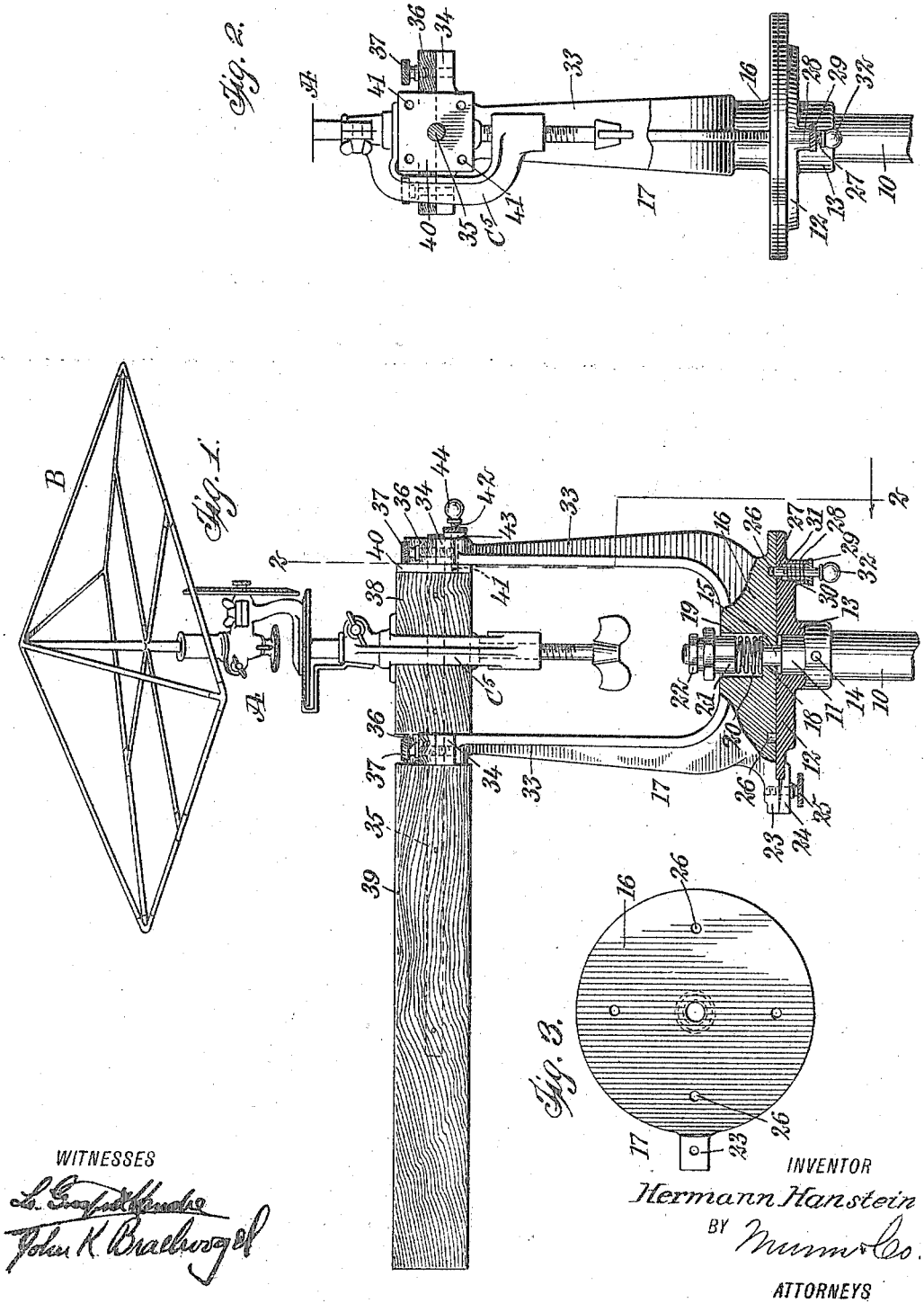
INVENTOR
Hermann Hanstein

UNITED STATES PATENT OFFICE.

HERMANN HANSTEIN, OF CHICAGO, ILLINOIS.

EDUCATIONAL APPLIANCE.

951,606.  Specification of Letters Patent.  Patented Mar. 8, 1910.

Application filed December 22, 1908. Serial No. 468,720.

*To all whom it may concern:*

Be it known that I, HERMANN HANSTEIN, a citizen of the United States, and a resident of Chicago, in the county of Cook and State of Illinois, have invented a new and Improved Educational Appliance, of which the following is a full, clear, and exact description.

This invention relates to educational appliances for displaying objects in giving instruction in various studies, and relates more particularly to a device of this kind for use in connection with the appliance shown in my United States Patent No. 672,062, dated April 16, 1901, and consists in the combination of a support mounted upon a suitable standard or the like, means for locking the support in a plurality of predetermined positions, means for holding the support in intermediate positions, a member journaled upon the support and arranged to carry the appliance for displaying objects described in the above-mentioned patent, or to carry any similar device, means for locking the member in a plurality of predetermined positions, and means for holding the member in intermediate positions.

The object of the invention is to provide a simple, inexpensive and durable educational appliance of the class described, which is compact and strong in form, which can be used in connection with any suitable device for displaying objects for class-room instruction and like purposes, which can be adjusted to arrange the object in a plurality of positions, which can be easily moved from place to place, and which can be manipulated without difficulty.

The invention consists in the construction and combination of parts to be more fully described hereinafter, and particularly set forth in the claims.

Reference is to be had to the accompanying drawings forming a part of this specification, in which similar characters of reference indicate corresponding parts in all the views, and in which—

Figure 1 is a front elevation showing an embodiment of my invention with parts in section and used in connection with the appliance described in the above-mentioned patent; Fig. 2 is a sectional side elevation of the device on the line 2—2 in Fig. 1; and Fig. 3 is an inverted plan view of the support.

Before proceeding to a more detailed explanation of my invention, it should be understood that in my United States Patent No. 672,062 is disclosed an educational appliance for displaying figures and objects to students, and which includes a clamp adapted to be secured to a fixed or other support. My present invention provides means for adjustably mounting this appliance in position, and provides a support to which the clamp can be attached. However, my present invention can be used with any other suitable device for displaying the objects, and is not necessarily limited to a combined use with the above-mentioned appliance set forth in my issued patent.

It is often necessary, in teaching various subjects such as drawing, solid geometry, projection, descriptive geometry, stereography, crystallography and the like, to display to students or others under instruction, objects which visualize the figures or bodies in various different positions. Unless a suitable device for this purpose is provided, it is difficult not only properly to display objects, but it is still more difficult to arrange the same in different positions. The objects which can be displayed by my invention may be of different kinds; for example, as shown in the accompanying drawings, skeleton frames can be used to represent geometrical and other bodies.

Referring more particularly to the drawings, I provide a standard 10 consisting of an upright post or the like, and having a constricted upper end 11 upon which is mounted a table 12 having a substantially central collar or hub 13. The table is rigidly secured upon the standard in any suitable manner, for example, by means of a pin or key 14. The standard has a constricted longitudinal extension 15 which projects above the table and receives the base 16 of a support 17. The base of the support has the lower surface flat to rest upon the table, and like the table, is circular. A substantially central opening 18 having an enlarged part 19 receives the extension 15. A helical spring 20 is arranged upon the latter, and abuts against lock nuts 21 and 22 arranged upon a threaded part of the extension so that the support is resiliently held upon the table.

At one side, the base 16 has a laterally extended ear 23 engaging at the rim of the table and having a clamping member 24 adjustably secured thereto by a thumb-screw 25. By tightening the latter, the clamping member which projects underneath the rim of the table, is jammed against the same to hold the support in a plurality of positions. The base of the support has a plurality of recesses 26 adapted to receive a stop 27 arranged in a barrel extension 28 of the table. A head 29 closes the open end of the barrel and holds a spring 30 within the same. The latter engages a transverse pin 31 of the stop and normally forces it against the support. The stop has a head 32 by means of which it can be easily manipulated. The spring holds the stop against the table and thus projects it automatically into one of the recesses 26 when the same is positioned over the stop.

The support has spaced, upwardly extending arms 33 terminating at their upper ends in bearings 34. A shaft 35 is journaled in the bearings and extends laterally beyond one of the arms. The upper bearing member 36 consists preferably of hard wood blocks adjustably mounted in place by thumb screws 37 or the like. By tightening up the thumb screws, the clamping block can be forced against the shaft to adjust the same in a plurality of positions. The shaft 35 between the arms, and on its extension, carries housings 38 and 39, consisting preferably of substantially rectangular hard wood blocks, for a purpose which will appear hereinafter.

Adjacent to one of the arms, the housing 38 has an end plate 40 provided with a plurality of openings 41, each adapted to receive the end of a stop 42. The latter is arranged in a barrel 43, and is resiliently forced toward the end plate similarly as the stop 27 is forced toward the base of the support. A head 44 permits the stop 42 to be easily manipulated. Preferably the recesses 26 and the recesses 41 are 90° apart, so that the support and the shaft can be held in four positions, at right angles. By means of the clamping member 24, the support can be held in a plurality of intermediate positions, and the shaft can likewise be held in a number of intermediate positions, by means of the bearing blocks 36.

The device A, for displaying the object B, as disclosed in my previously mentioned patent, includes a simple clamp C⁵, by means of which the device A can be secured upon the housing 38 or the housing 39. Any other suitable means for this purpose can be employed. Needless to say, by adjusting the support upon the base and about the extension 15, and by adjusting the shaft in its bearings, different positions of the object can be obtained while the device A, itself, may permit of arranging the object in a number of different positions. By locating the device A upon the housing 39 at one side of the support, the object can be depressed without coming into contact with the support.

I have not endeavored to set forth the various uses of my invention, but it will be seen that it may be used for considering for any purpose, surfaces and solids, thus allowing the student to obtain a correct representation of such surface or solid in any position. It can also be used for displaying articles for purposes other than educational.

Having thus described my invention, I claim as new, and desire to secure by Letters Patent:—

1. In combination, a standard, a support adapted to be arranged in a plurality of positions thereon, means for locking the support, a member journaled upon the support, means for locking the member in predetermined position, means for holding said member in a plurality of intermediate positions, said member extending at one end beyond the support, an appliance for displaying objects mounted upon said member and adjustable longitudinally thereof and means for locking the appliance in adjusted position.

2. In combination, a standard having a table, a support rotatably mounted upon said table, a spring-pressed stop adapted to engage said support to lock the same in a plurality of positions, said support having a clamp adapted to engage said table for holding said support in a plurality of intermediate positions, said support having bearings, a member journaled in said bearings, an appliance for displaying objects carried by said member, said member having a plate, and a second spring-pressed stop adapted to engage said plate to lock said member in a plurality of positions, said bearings having adjustable blocks serving to hold said member in a plurality of intermediate positions.

3. In combination, a standard having a constricted upper end provided with a longitudinal extension, a table mounted upon said constricted end, a support having a base mounted upon said table and presenting an opening adapted to receive said extension, a spring on said extension, a lock nut engaging said spring to hold said support resiliently upon said table, said base having a clamp adapted to engage at the edge of said table, said base having recesses, a normally projected stop carried by said table and adapted to engage in said recesses to lock said support in place, said support having upwardly extending spaced arms, bearings at the upper ends of said arms having adjustable blocks, a shaft journaled in said bearings and extending at one end outwardly beyond one of said arms, housings on said shaft intermediate said arms, and at said extended end of said shaft, an appliance for displaying objects carried by said housings, a plate carried by said first housing and having recesses, one of said arms having a normally projected stop adapted to engage said recesses to lock said housings and said shaft in a plurality of positions.

4. In combination, a standard, a table supported at the top thereof, a support rotatable on the table, means for locking the support to the table in adjusted position, arms extending upwardly from the support, a shaft journaled in the ends of the arms, a housing on the shaft, and an appliance for displaying objects detachably connected with the housing.

5. In combination, a standard, a table having a step bearing for engaging the end of the standard, a support rotatable on the table, means for clamping the support to the table, said support having arms, a shaft journaled in the arms, and an appliance for displaying objects adjustably connected with the shaft.

6. A device of the class described comprising a standard, a table secured to the upper end thereof, a support rotatable on the table, means for clamping the support to the table, a shaft journaled on the support, and an appliance for displaying objects connected with the shaft.

In testimony whereof I have signed my name to this specification in the presence of two subscribing witnesses.

HERMANN HANSTEIN.

Witnesses:
W. P. WEICK,
CARL HANSTEIN.